UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

CHLOR-METHYL-OMEGA-BROM-PROPYL-CARBINOL AND PROCESS OF PRODUCING SAME.

1,114,734.      Specification of Letters Patent.    Patented Oct. 27, 1914.

No Drawing.    Application filed July 14, 1913. Serial No. 778,883.

*To all whom it may concern:*

Be it known that I, ALEX B. DAVIS, a citizen of the United States, residing at Indianapolis, Marion county, and State of Indiana, have invented and discovered certain new and useful Improvements in Chlor-Methyl-Omega-Brom-Propyl-Carbinol and Processes of Producing Same, of which the following is a specification.

The invention relates to the hitherto unknown chlor-methyl-omega-brom-propyl-carbinol to which may be ascribed the formula

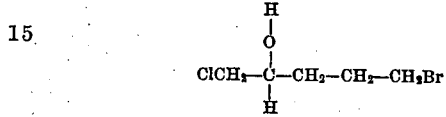

It is a valuable intermediate product in the preparation of other compounds. To produce this compound ethylene bromid is converted into brom-ethyl-magnesium-bromid by dissolving one molecular proportion of magnesium in an absolute ethereal solution of ethylene bromid, and adding to this one molecular proportion of epichlorhydrin. The brom-ethyl-magnesium-bromid condenses with the epichlorhydrin to form a magnesium derivative of the new carbinol, which is then decomposed by acids liberating the new compound.

The process in detail may be carried out as follows: 188 grams of ethylene bromid are mixed with 300 c. c. of absolute ether and placed in a flask connected to a reflux condenser. 24 grams of magnesium in the form of ribbon, turnings, wire or other suitable form are added gradually through the condenser, one or two grams at a time. The magnesium dissolves rapidly producing a compound of the formula:—

When all the magnesium has been added, 93 grams of epichlorhydrin, diluted with its own volume of ether are run in through the condenser. A strong reaction takes place with liberation of much heat and the two compounds condense to a magnesium derivative of the new carbinol. After standing a short time, this solidifies to a mass of nearly white crystals. The crystalline mass thus obtained is mixed with powdered ice and acidified with dilute sulfuric acid. A layer consisting of the new compound in solution in ether separates and is drawn off, the ether evaporated and the residue distilled in vacuum, when it boils at 100° C., under 20 m. m. pressure and has the formula—

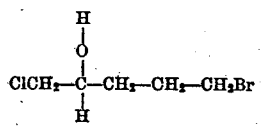

Having thus described my invention what I claim is:

1. A carbinol having the formula—

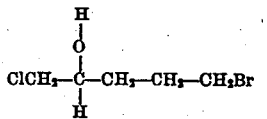

2. The process of producing a carbinol by condensing brom-ethyl-magnesium bromid with epichlorhydrin.

3. The process of producing a carbinol by condensing brom-ethyl magnesium bromid of the following formula $BrCH_2—CH_2—MgBr$ with epichlorhydrin of the following formula

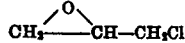

4. The process of producing chlor-methyl-omega-brom-propyl-carbinol which consists in dissolving one molecular proportion of magnesium in an absolute ethereal solution of ethylene bromid, and adding one molecular proportion of epichlorhydrin and then decomposing the derivative by an acid suitable for liberating the carbinol.

In witness whereof, I have hereunto set my hand and seal at Indianapolis, Indiana, this thirtieth day of June, A. D. nineteen hundred and thirteen.

ALEX B. DAVIS. [L. S.]

Witnesses:
  FRANK R. ELDRED,
  H. W. RHODEBAND.